(12) United States Patent  
Yamamoto et al.

(10) Patent No.: US 10,904,497 B2  
(45) Date of Patent: Jan. 26, 2021

(54) IMAGE PROJECTION APPARATUS, ITS CONTROL METHOD, AND STORAGE MEDIUM

(71) Applicant: CANON KABUSHIKI KAISHA, Tokyo (JP)

(72) Inventors: Hiroshi Yamamoto, Ageo (JP); Yuya Kurata, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/671,355

(22) Filed: Nov. 1, 2019

(65) Prior Publication Data  
US 2020/0145626 A1 May 7, 2020

(30) Foreign Application Priority Data  
Nov. 6, 2018 (JP) ................. 2018-208512

(51) Int. Cl.  
*H04N 9/31* (2006.01)  
*G03B 21/20* (2006.01)

(52) U.S. Cl.  
CPC ....... *H04N 9/3155* (2013.01); *G03B 21/2013* (2013.01); *G03B 21/2033* (2013.01); *G03B 21/2053* (2013.01); *H04N 9/312* (2013.01); *H04N 9/3161* (2013.01)

(58) Field of Classification Search  
CPC .. H04N 9/3161; H04N 9/3129; H04N 9/3194; H04N 9/3173; H04N 9/3138  
See application file for complete search history.

(56) References Cited

U.S. PATENT DOCUMENTS

2004/0239818 A1* 12/2004 Sugiyama .............. H04N 9/315  
348/745

FOREIGN PATENT DOCUMENTS

| JP | 2004279943 A | 10/2004 |
| JP | 2007248597 A | 9/2007 |
| JP | 2017129700 A | 7/2017 |
| JP | 2017157475 A | 9/2017 |

* cited by examiner

*Primary Examiner* — Samira Monshi  
(74) *Attorney, Agent, or Firm* — Rossi, Kimms & McDowell LLP

(57) ABSTRACT

An image projection apparatus includes a light source unit including a plurality of laser light sources, a light modulation element configured to modulate illumination light generated using a laser beam from the light source unit and to generate image light projected onto a projection surface, and a controller configured to control driving of the plurality of laser light sources. The controller controls a luminance of the illumination light by selecting a first laser light source that emits the laser beam and a second laser light source that does not emit the laser beam among the plurality of laser light sources.

14 Claims, 15 Drawing Sheets

| LUMINANCE [%] | LIGHT SOURCE 4a | LIGHT SOURCE 4b | LIGHT SOURCE 4c | LIGHT SOURCE 4d |
|---|---|---|---|---|
| 50~100 | EMISSION | EMISSION | EMISSION | EMISSION |
| 37.5~50 | EMISSION | EMISSION | EMISSION | NON-EMISSION |
| 25~37.5 | EMISSION | EMISSION | NON-EMISSION | NON-EMISSION |
| 12.5~25 | EMISSION | NON-EMISSION | NON-EMISSION | NON-EMISSION |

IMAGE PROJECTION APPARATUS, ITS CONTROL METHOD, AND STORAGE MEDIUM

BACKGROUND OF THE INVENTION

Field of the Invention

The present invention relates to an image projection apparatus, such as a liquid crystal projector.

Description of the Related Art

Some image projection apparatuses use a light source unit including a plurality of laser light sources (laser diodes: LD). Illumination light from the light source unit is modulated by a light modulation element, such as a liquid crystal panel, and projected as image light onto a projection surface, thereby displaying a projection image.

Japanese Patent Laid-Open No. ("JP") 2017-129700 discloses a projector that adjusts outputs of a plurality of LDs or a luminance of illumination light from a light source unit by driving pulses of the plurality of LDs and changing the duty of the pulse driving. This projector drives a light modulation element in an analog manner.

However, when the light modulation element is digitally driven and the LD is pulse-driven as in the projector of JP 2017-129700, the pulse driving may interfere with the digital driving of the light modulation element and a good projection image may not be obtained.

SUMMARY OF THE INVENTION

The present invention provides an image projection apparatus, which can adjust the luminance of light from a light source unit including a plurality of laser light sources while displaying a good projection image.

An image projection apparatus according to one aspect of the present invention includes a light source unit including a plurality of laser light sources, a light modulation element configured to modulate illumination light generated using a laser beam from the light source unit and to generate image light projected onto a projection surface, and a controller configured to control driving of the plurality of laser light sources. The controller controls a luminance of the illumination light by selecting a first laser light source that emits the laser beam and a second laser light source that does not emit the laser beam among the plurality of laser light sources.

A light source control method according to another aspect of the present invention for an image projection apparatus configured to modulate illumination light generated using a laser beam from a light source unit including a plurality of laser light sources, through a light modulation element, and to project an image on a projection surface includes controlling a luminance of the illumination light by selecting a first laser light source that emits the laser beam and a second laser light source that does not emit the laser beam among the plurality of laser light sources.

A non-transitory computer-readable storage medium storing a computer program that enables a computer to execute the above light source control method constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
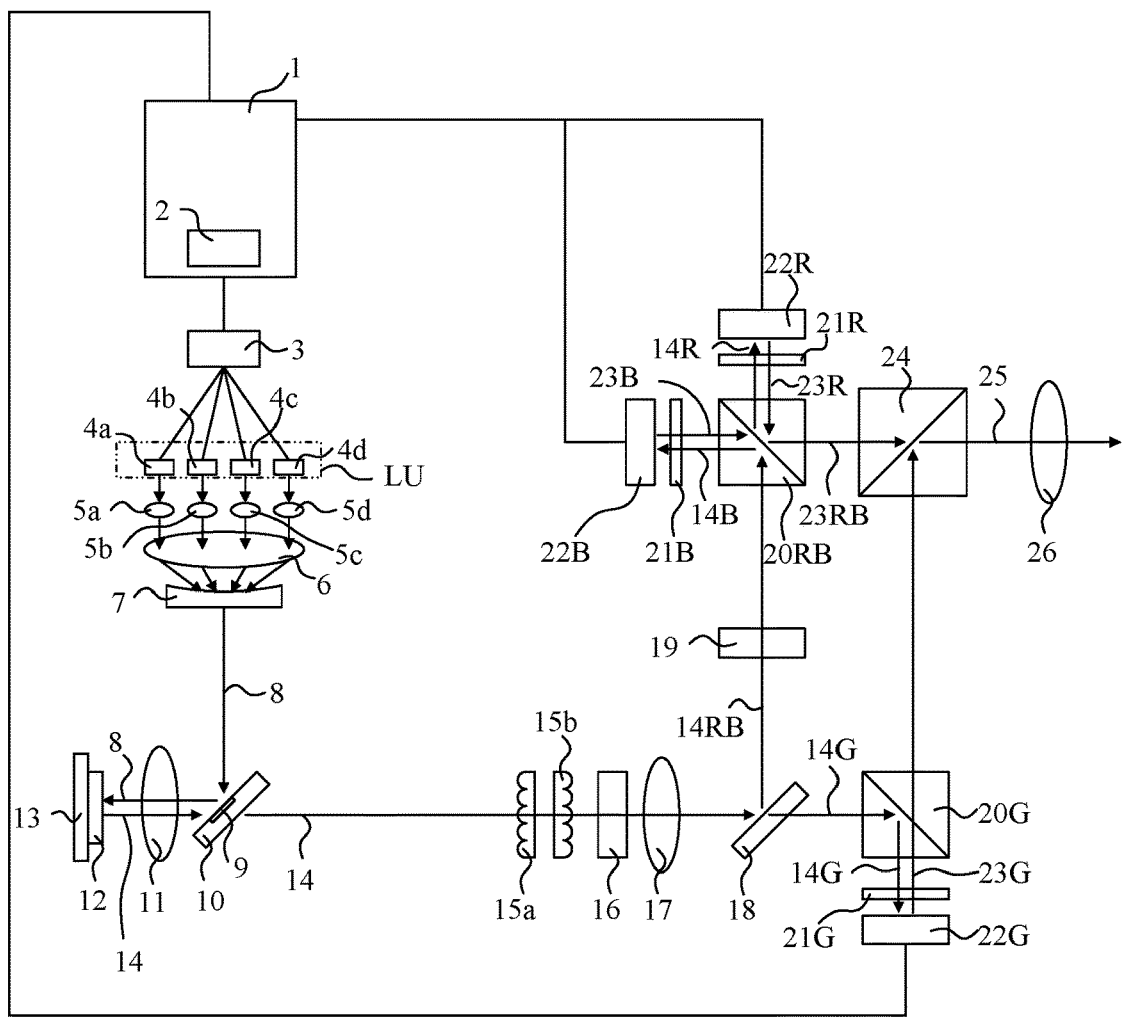
FIG. 1 illustrates a configuration of a projector according to a first embodiment of the present invention.

FIG. 1 illustrates a configuration of a projector as an image projection apparatus according to a first embodiment of the present invention. In the following description, R, G, and B stand for red, green, and blue, respectively.

The projector includes a controller 1 and a light source driver 3. The controller 1 includes a drive current determiner (determination unit) 2. The projector further includes a light source unit LU including a plurality of laser light sources 4a to 4d, collimator lenses 5a to 5d, a first lens 6, a second lens 7, a light reflecting member 9, a glass plate 10, a third lens 11, and a phosphor 12. The collimator lenses 5a to 5d to the phosphor 12 constitute a light generator. The projector further includes a first fly-eye lens 15a, a second fly-eye lens 15b, a polarization conversion element 16, a fourth lens 17, a dichroic mirror 18, a wavelength-selective phase plate 19, an RB polarization beam splitter 20RB and a G polarizing beam splitter 20G. The projector further includes an R quarter waveplate 21R, a G quarter waveplate 21G, a B quarter waveplate 21B, an R light modulation element 22R, a G light modulation element 22G, a B light modulation element 22B, a color combining prism 24, and a projection lens 26.

The controller 1 includes a computer such as a CPU, and controls an operation of the projector in accordance with a computer program. The drive current determiner 2 determines a drive current to be supplied to each of the laser light sources 4a to 4d. The light source driver 3 supplies the drive current determined by the drive current determiner 2 to the laser light sources 4a to 4d to drive the laser light sources 4a to 4d. The laser light sources 4a to 4d are semiconductor lasers (laser diodes) that emit blue (B) light. The peak wavelength of each laser light source is, for example, 455 nm.

Figure 2:
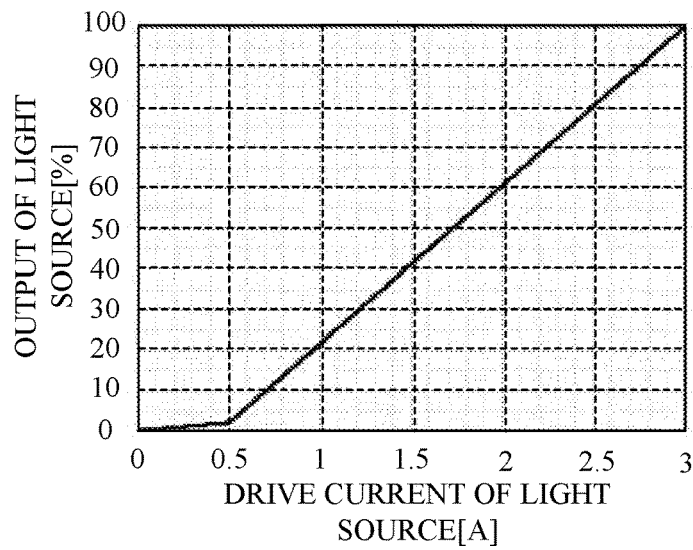
FIG. 2 illustrates a relationship between a drive current of a light source and a luminance in a projector according to the first embodiment.

FIG. 2 illustrates a relationship between the drive current and output of the laser light source. The rated current of each laser light source is 3 amperes (A), and the threshold current as the minimum value of the drive current that can emit the laser beam is 0.5 A. In this embodiment, the lower limit value of the drive current of each laser light source is 1.7 A. This lower limit value is a drive current when 50% of the output of the laser light source is output when the rated current is set to 3 A.

The B lights emitted from the laser light sources 4a to 4d enter the collimator lenses 5a to 5d, respectively. Each collimator lens converts divergent light from each laser light source into collimated light. An arrow direction in FIG. 1 represents a light traveling direction. This is the same in the drawings used in other embodiments described later.

The laser beams emitted from the collimator lenses 5a to 5d are emitted as excitation light 8 with a beam diameter adjusted by the first lens 6 and the second lens 7. The excitation light 8 is reflected by the light reflecting member 9 provided on the surface of the glass plate 10, and is irradiated on the phosphor 12 through the third lens 11. The light reflecting member 9 is provided only on part of the surface of the glass plate 10 which the excitation light 8 enters. The third lens 11 condenses the excitation light 8 to form a light irradiation area of a predetermined size on the phosphor 12.

The phosphor 12 is made, for example, of YAG: Ce. The phosphor 12 is supported by a phosphor supporting member 13. The phosphor supporting member 13 is formed of a metal such as aluminum or a material having the same function. In order to efficiently dissipate the heat from the phosphor 12, the phosphor supporting member 13 (or the phosphor 12) may be rotated by a motor. The phosphor 12 converts a wavelength of part of the blue excitation light 8 and emits yellow fluorescent light. The fluorescent light and the blue excitation light that has not been converted by the phosphor 12 are combined into illumination light 14.

The illumination light 14 enters the third lens 11 and is converted into collimated light, and further passes the glass plate 10 other than the light reflecting member 9. The illumination light 14 as white light transmitted through the glass plate 10 passes through the first fly-eye lens 15a and the second fly-eye lens 15b, is divided into a plurality of light beams, and enters the polarization conversion element 16. The polarization conversion element 16 converts the illumination light 14 which is non-polarized light into linearly polarized light having a specific polarization direction (in this embodiment, S-polarized light having a polarization direction perpendicular to the paper surface of FIG. 1). A plurality of light beams as the illumination light 14 emitted from the polarization conversion element 16 are collected by the fourth lens 17 and superimposed on the light modulation elements 22R, 22G, and 22B so as to illuminate these modulation surfaces with a uniform luminance. The first fly-eye lens 15a, the second fly-eye lens 15b, and the fourth lens 17 constitute a uniform (illumination) optical system.

The illumination light 14 that has passed through the fourth lens 17 enters the dichroic mirror 18. The dichroic mirror 18 reflects RB light 14RB of the illumination light 14 and transmits the G light 14G. The S-polarized G light 14G that has transmitted through the dichroic mirror 18 enters the G polarization beam splitter 20G, is reflected by the polarization separation surface, and is guided to the G light modulation element 22G. The G light modulation element 22G, the R light modulation element 22R, and the B light modulation element 22B are digitally driven reflection type liquid crystal display elements.

Figure 16:
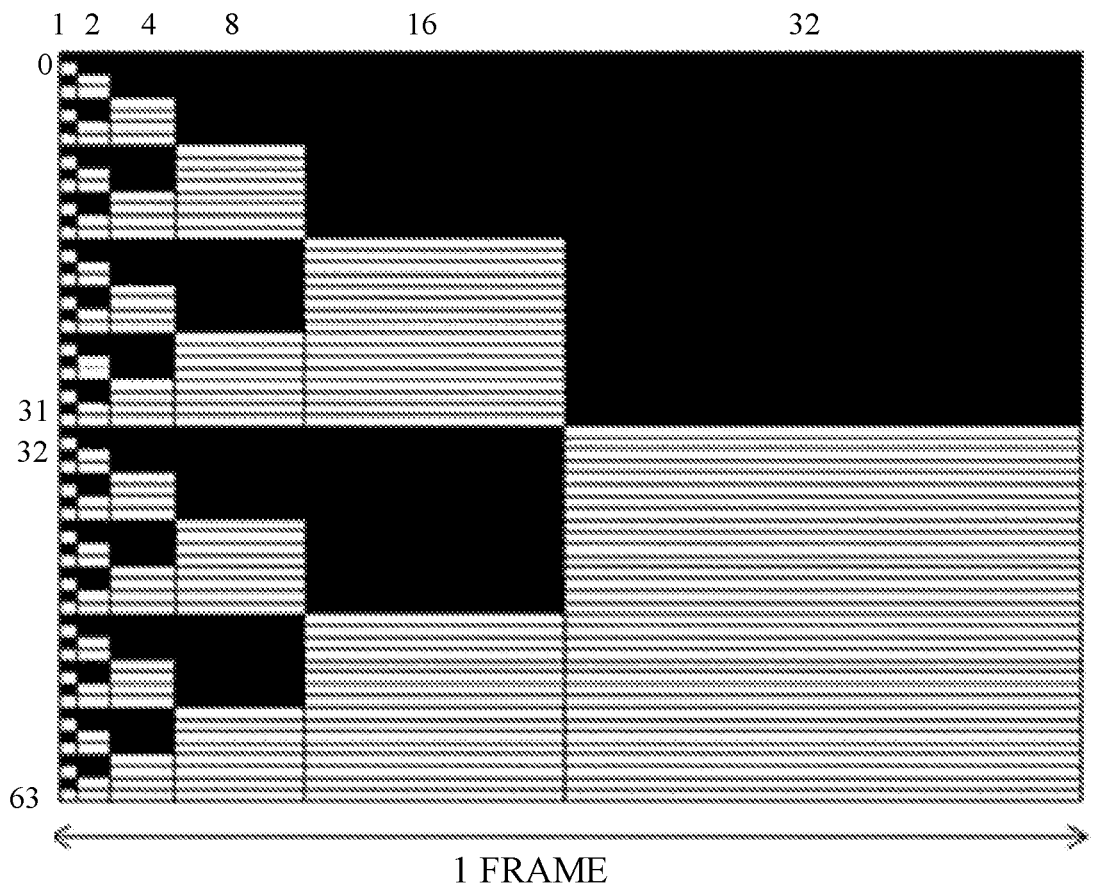
FIG. 16 illustrates illustrative ON/OFF driving of a light modulation element.
Figure 17A:
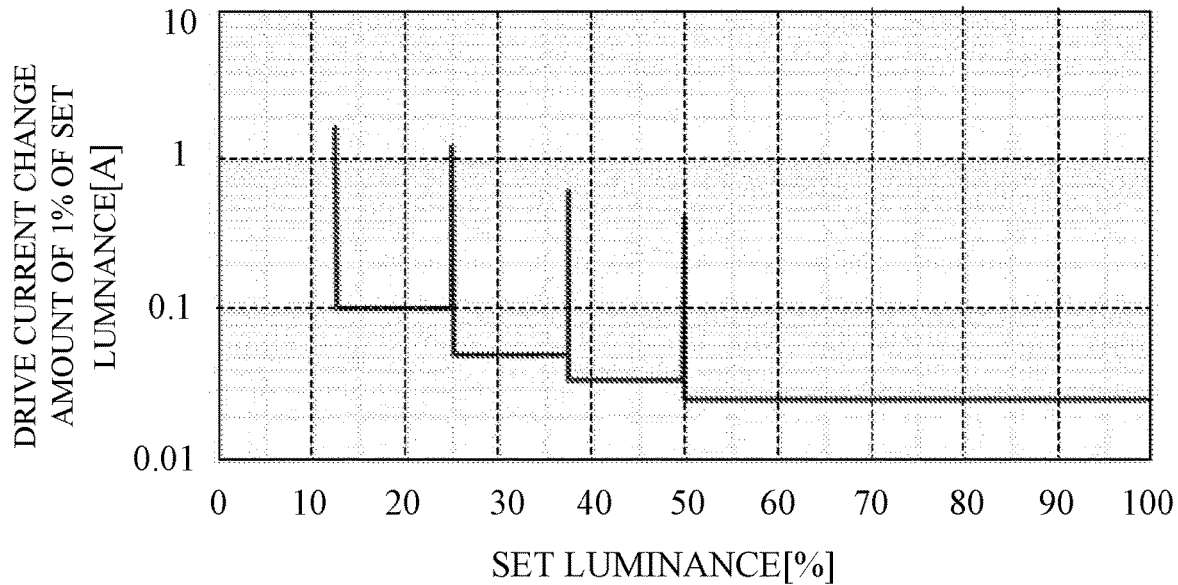
FIGS. 17A to 17D show a relationship between a set luminance and a drive current change amount per 1% of the set luminance in the projector according to a seventh embodiment.
Figure 17B:
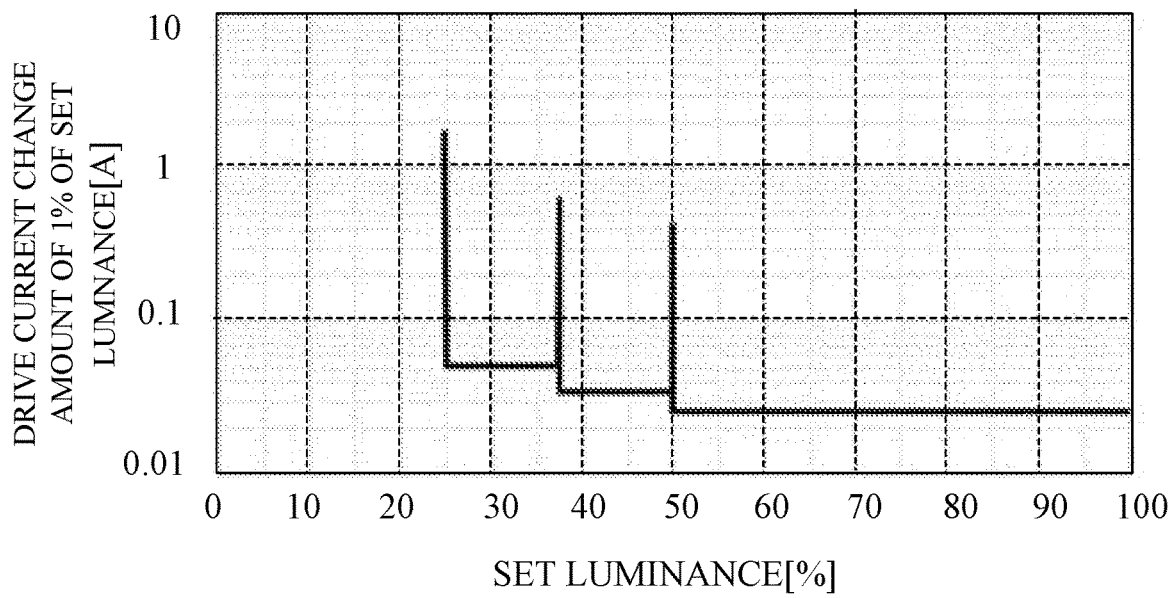
Figure 17C:
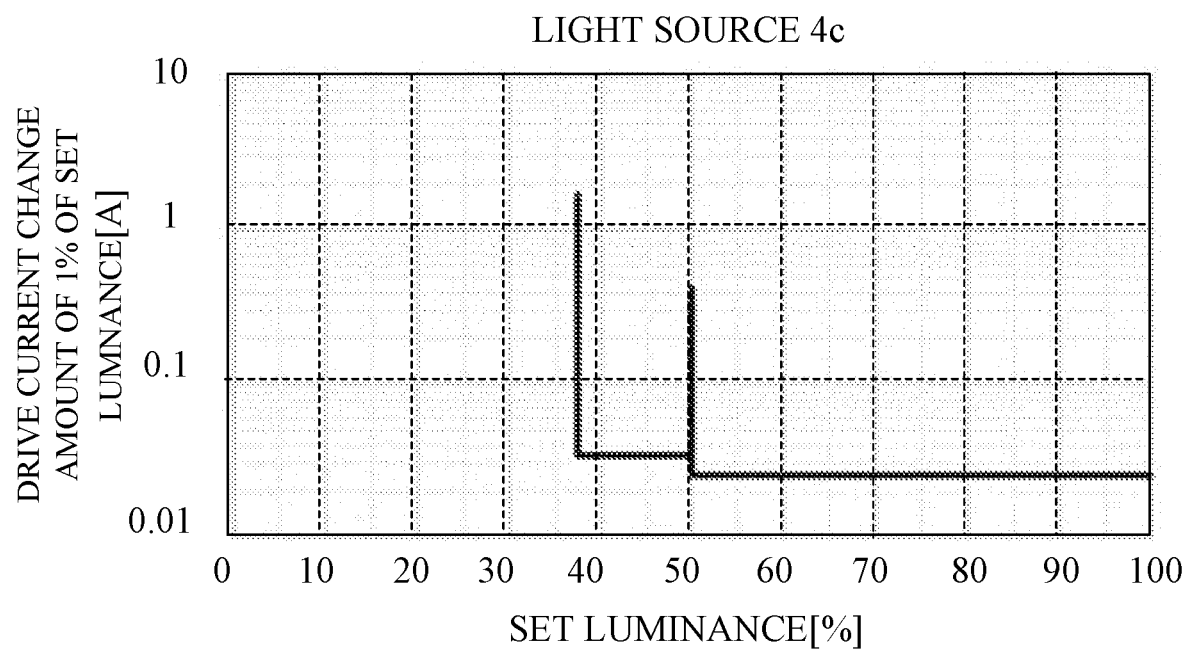
Figure 17D:
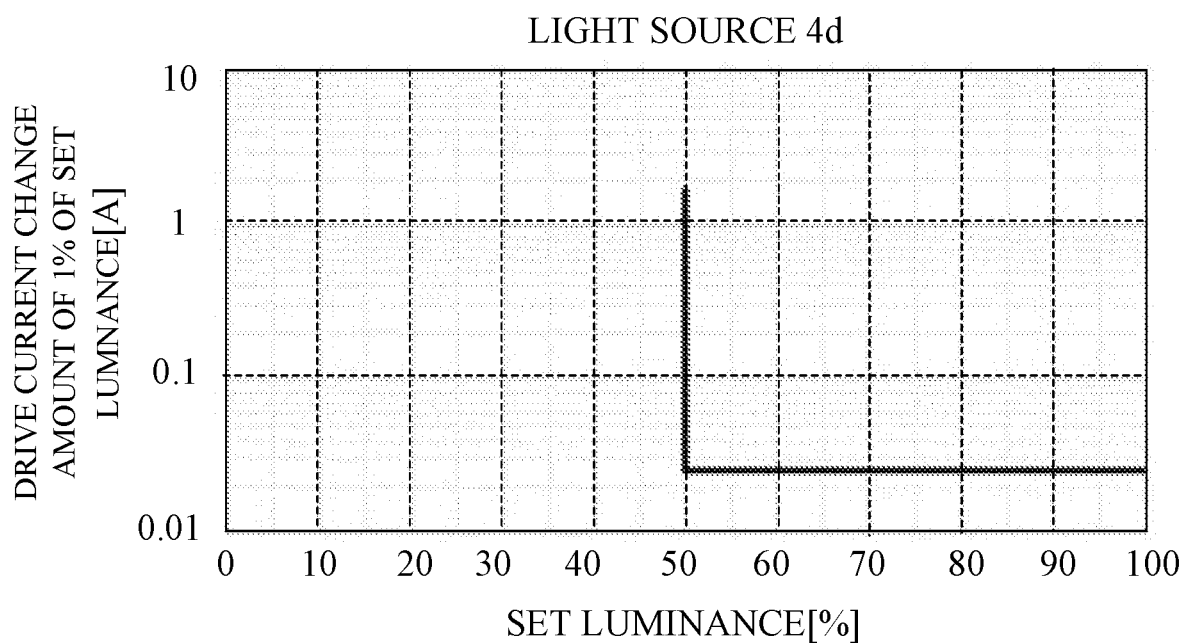

Each pixel included in each light modulation element is turned on (with the voltage applied) or turned off (with the voltage applied lower than that of the ON voltage or no voltage applied) in each of a plurality of subframe periods set in one frame period. By controlling the duty (ON (turning-on) period or OFF (turning-off) period) in this ON/OF driving, each pixel expresses a gradation. FIG. 16 illustrates illustrative ON/OFF driving (digital driving) of each light modulation element. The abscissa axis represents time (one frame period), and the ordinate axis represents the gradation. One frame period is divided into six subframe periods having time weights of 1, 2, 4, 8, 16, and 32. A white subframe period in the figure indicates the ON period, and a black subframe period indicates the OFF period.

The ON/OFF driving of the light modulation elements 22R, 22G, and 22B is controlled by the controller 1 as a driver in accordance with an image signal (input image signal) input from the outside to the projector.

The G light modulation element 22G modulates the G light 14G and reflects it to emit modulated light 23G. The S-polarized component of the modulated light 23G is reflected by the polarization separation surface of the G polarization beam splitter 20G, returned to the light source side, and removed from the projection light. On the other hand, the P-polarized component in the modulated light 23G is transmitted through the polarization separation surface of the G polarization beam splitter 20G. The G quarter waveplate 21G is provided in order to suppress the polarization state disturbance generated by the G polarization beam splitter 20G and the G light modulation element 22G during the black display. The modulated light 23G emitted from the G polarization beam splitter 20G enters the color combining prism 24.

The RB light 14RB reflected by the dichroic mirror 18 enters the wavelength-selective phase plate 19. The wavelength selective phase plate 19 rotates the polarization direction of the R light by 90° to make it the P-polarized light and transmits the B light as it is as the S-polarized light. The RB light 14RB that has transmitted through the wavelength-selective phase plate 19 enters the RB polarization beam splitter 20RB. The RB polarizing beam splitter 20RB transmits R light 14R that is the P-polarized light and reflects B light 14B that is the S-polarized light. The R light 14R that has transmitted through the polarization separation surface of the RB polarization beam splitter 20RB enters the R light modulation element 22R. The R light modulation element 22R modulates the R light 14R, reflects it, and emits modulated light 23R. Of the modulated light 23R, the P-polarized light component passes through the polarization separation surface of the RB polarization beam splitter 20RB, returns to the light source side, and is removed from the projection light. On the other hand, the S-polarized light component of the modulated light 23R is reflected by the polarization separation surface of the RB polarization beam splitter 20RB and guided to the color combining prism 24.

The B light 14B reflected on the polarization separation surface of the RB polarization beam splitter 20RB enters the B light modulation element 22B. The B light modulation element 22B modulates the B light 14B, reflects it, and emits modulated light 23B. Of the modulated light 23B, the S-polarized light component is reflected on the polarization separation surface of the RB polarization beam splitter 20RB, returns to the light source side, and is removed from the projection light. On the other hand, the P-polarized light component of the modulated light 23B passes through the polarization separation surface of the RB polarization beam splitter 20RB and enters the color combining prism 24. The R quarter waveplate 21R and the B quarter waveplate 21B are also provided in order to restrain the polarization state disturbance from being generated during the black display.

The color combining prism 24 reflects the incident modulated light 23G and transmits the modulated lights 23R and 23B, thereby combining them to each other, and generating the projection light 25 as image light including image information. The projection light 25 is projected onto a projection surface such as a screen (not shown) via the projection lens 26. Thereby, a color image is displayed as a projection image. The optical path illustrated in FIG. 1 is used for the white display. This is the same as other embodiments described later.

Figures 3, 4:
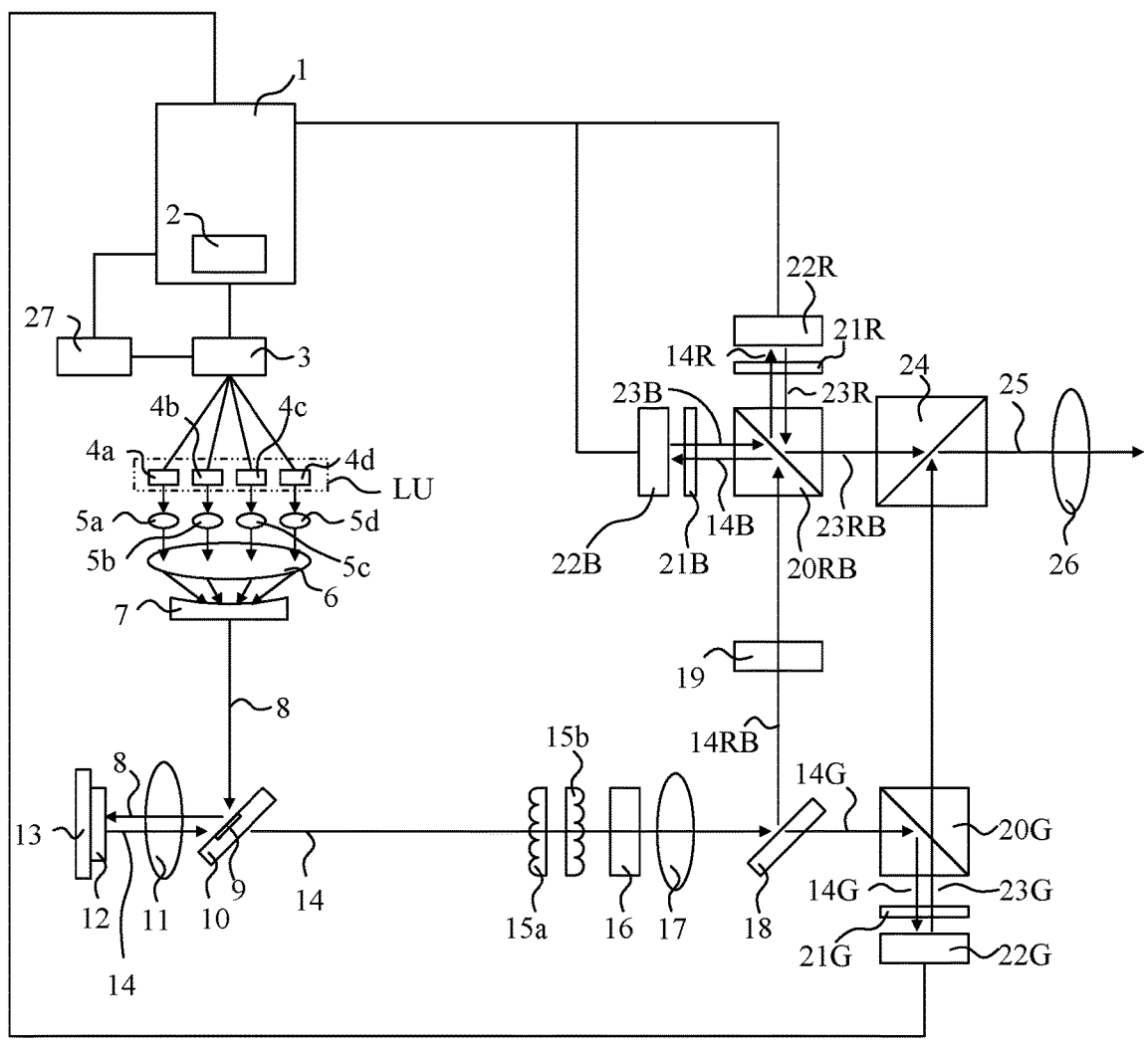
FIG. 3 illustrates a relationship between the luminance of the projection light and the emission light source in the projector according to the first embodiment.
FIG. 4 illustrates a configuration of a projector according to a second embodiment of the present invention.

Referring now to FIG. 3, a description will be given of a relationship between the luminance of the projection light and the laser light source to be turned on among the plurality of laser light sources 4a to 4d (first laser light source: referred to as an emission light source hereinafter) in the projector according to this embodiment. In the following description, the "emission" of the laser light source means driving of the laser light source to emit a laser beam or supplying a drive current higher than the above threshold current to the laser light source. However, in this embodiment, as described above, the lower limit value of the drive current of the laser light source is set higher than the threshold current. On the other hand, the "non-emission" of the laser light source means that non-driving of the laser light source or the drive current supplied to the laser light source set to 0, and the laser light source driven to emit the light as an LED. This means that the drive current lower than the threshold current is supplied. The laser light source that is not turned on (second laser light source) will be referred to as a non-emission light source in the following description.

FIG. 3 shows a selection of the emission light source (light source selection processing and light source control method) for realizing the luminance of the projection light illustrated in the figure. In this embodiment, the controller 1 adjusts the output of each laser light source in a range of 50% to 100%. Therefore, in the projector according to this embodiment having the four laser light sources 4a to 4d, the controller 1 adjusts the luminance of the projection light in a range of 12.5% to 100%. More specifically, in adjusting the luminance of the projection light in the range of 12.5 to 25%, the controller 1 selects only the laser light source 4a as the emission light source (or uses the laser light sources 4b to 4d as the non-emission light sources). In adjusting the luminance of the projection light in a range of 25% to 37.5%, the controller 1 selects only the laser light sources 4a and 4b as the emission light sources (or the laser light sources 4c and 4d as the non-emission light sources). In adjusting the luminance of the projection light in a range of 37.5% to 50%, the controller 1 selects only the laser light sources 4a to 4c as the emission light sources (or the laser light source 4d as the non-emission light source). In adjusting the luminance of the projection light in a range of 50% to 100%, the controller 1 selects all of the laser light sources 4a to 4d as the emission light sources.

The boundary value of the luminance adjustment range of the projection light is not limited to the above example, and may be set to any of 37.5% to 75% when the three laser light sources are turned on. When the two light sources are turned on, any of 25% to 50% may be set.

In order to adjust the luminance of the projection light to 12.5% while all the laser light sources 4a to 4d are turned on, it is necessary to set the drive current of each laser light source to about 0.7 A, as understood from FIG. 2. Since this drive current is lower than 1.7 A, which is the lower limit value of the drive current in this embodiment, a time necessary for the drive current to become lower than the threshold current (see FIG. 11 described in a fifth embodiment) increased by the deterioration of the laser light source is shorter than the time in this embodiment. In other words, when the laser light source is deteriorated, all the laser light sources are turned on, and the luminance of the projection light is adjusted to be low, the laser light source below the threshold current is not turned on and thus the projection light does not have a desired luminance. However, this embodiment can adjust (control) the luminance of the illumination light that is the output of the light source unit to a low range, when the light modulation element is digitally driven, without causing the image quality of the projection image to deteriorate (or while displaying a good projection image).

Second Embodiment

FIG. 4 illustrates a configuration of a projector according to a second embodiment of the present invention. The projector according to this embodiment is different from that of the first embodiment in having a memory (storage unit) 27. The memory 27 receives and stores light emission histories of the laser light sources 4a to 4d from the light source driver 3. The light emission history is a history of the drive current and light emission time of each laser light source. The light emission history may include the environmental temperature of the projector, the temperature of each laser light source, and the like. The drive current determiner 2 determines the drive current of each laser light source using the light emission history of each laser light source stored in the memory 27.

Figure 5:
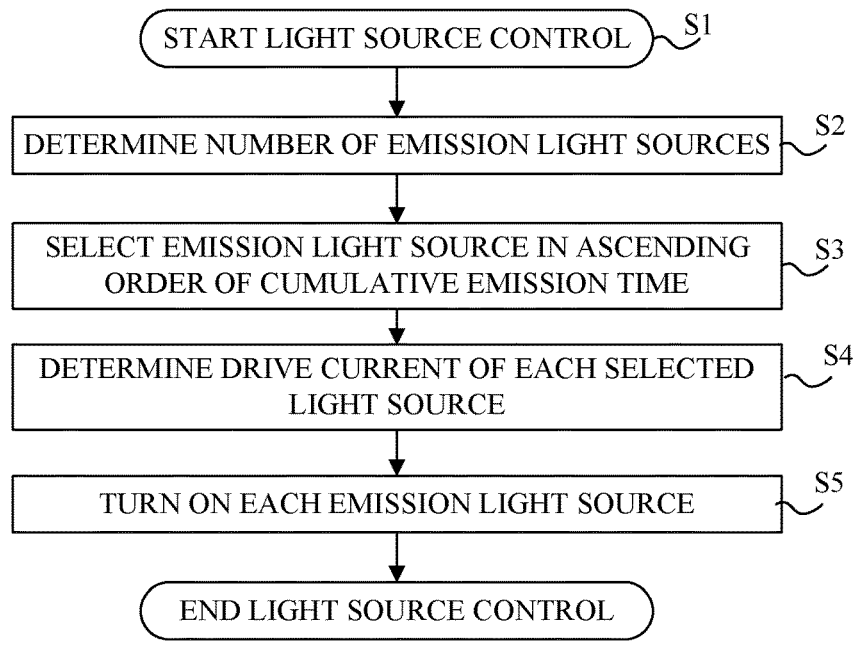
FIG. 5 is a flowchart showing processing performed by the projector according to the second embodiment.

A flowchart in FIG. 5 illustrates light source control processing (light source control method) performed by the controller 1 in this embodiment. The controller 1 executes this processing in accordance with a light source control program that is a computer program. The same applies to the light source control processing in other embodiments described later.

In the step (abbreviated as "S" in the FIG. 1, the controller 1 starts this processing. The start timing of this processing may be determined by the user or may be a predetermined timing. It may be always performed when the projector is started. This also applies to the step 1 in other embodiments described later.

Next, in the step 2, the controller 1 (drive current determiner 2) determines the number of emission light sources required to obtain the luminance of the projection light adjusted in accordance with a user operation via an operation panel or a remote controller attached to the projector body (referred to as target luminance hereinafter). At this time, the number of emission light sources may be determined as described with reference to FIG. 3 in the first embodiment, or may be determined by another determination method.

Next, in the step 3, the controller 1 (drive current determiner 2) refers to the light emission history stored in the memory 27 and selects the number of emission light sources determined in the step 2 in the ascending order of the cumulative emission time among the laser light sources 4a to 4d.

Next, in the step 4, the controller 1 (drive current determiner 2) determines the drive current of each of the one or more emission light sources selected in the step 3 in order to set the luminance of the projection light to the target luminance.

Next, in the step 5, the controller 1 causes the light source driver 3 to supply the drive current determined in the step 4 to each of one or more emission light sources selected in the step 3 to turn on each emission light source. Then, this flow ends.

This embodiment preferentially turns on a laser light source having a shorter cumulative emission time using the light emission history of each laser light source stored in the memory 27. This configuration can prevent a specific laser light source from deteriorating earlier than another laser light source.

Third Embodiment

Figure 6:
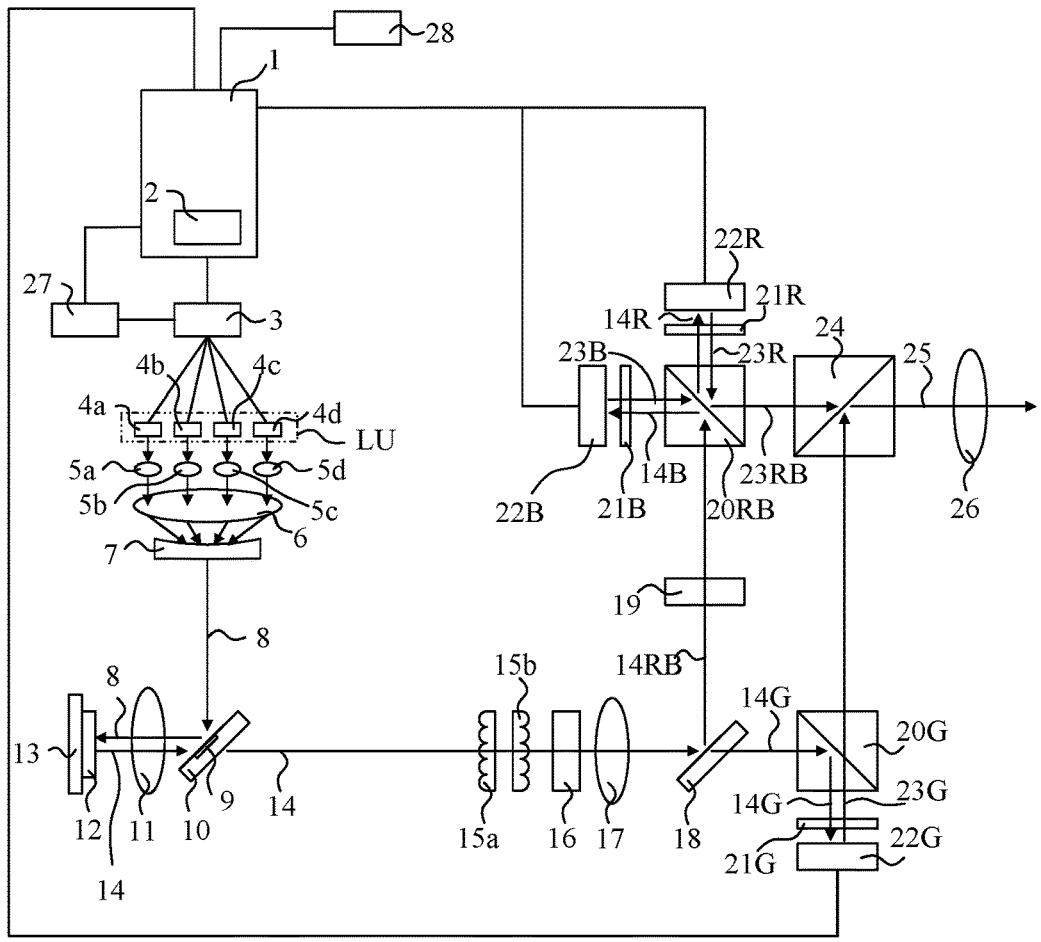
FIG. 6 illustrates a configuration of a projector according to a third embodiment of the present invention.

FIG. 6 illustrates a configuration of a projector according to a third embodiment of the present invention. The projector according to this embodiment is different from that of the second embodiment in having a luminance setter (setting unit) 28. The luminance setter 28 sets the luminance of the projection image (projection light) in accordance with a user operation via an operation panel attached to the projector body or a remote controller. The luminance set by the luminance setter 28 is information on the luminance adjustment of the illumination light.

Figure 7:
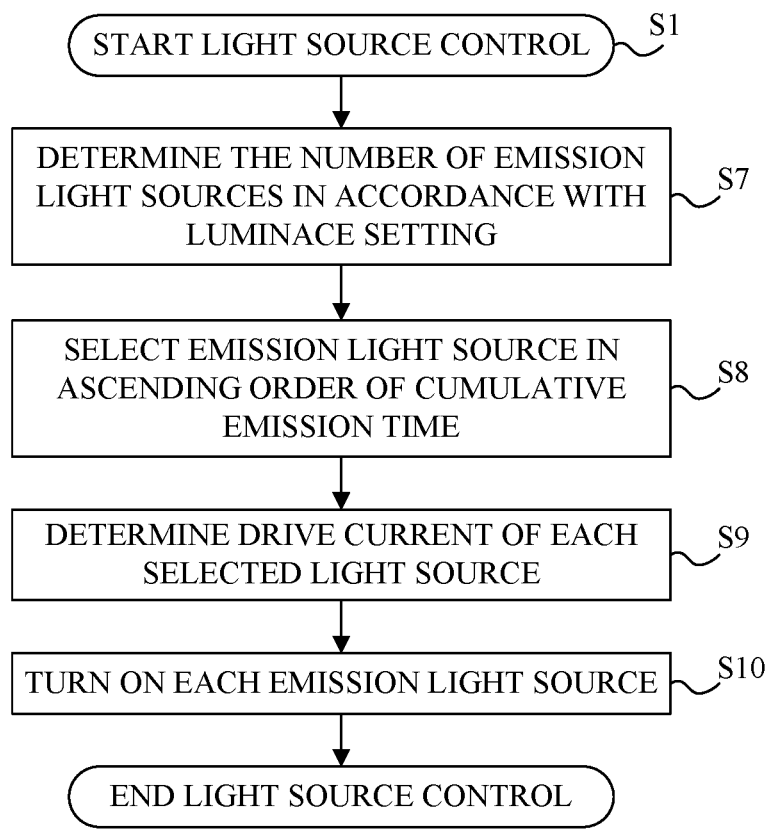
FIG. 7 is a flowchart showing processing performed by the projector according to the third embodiment.
Figure 8A:
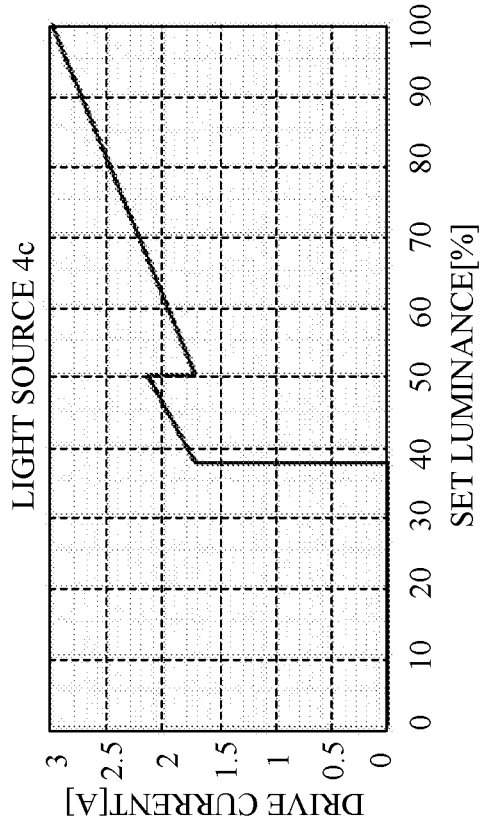
FIGS. 8A to 8D show a drive current for each light source in the projector according to the third embodiment.
Figure 8B:
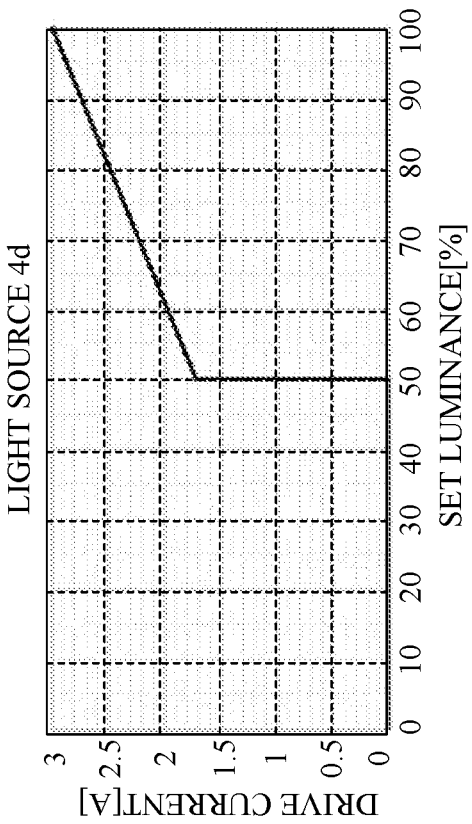
Figure 8C:
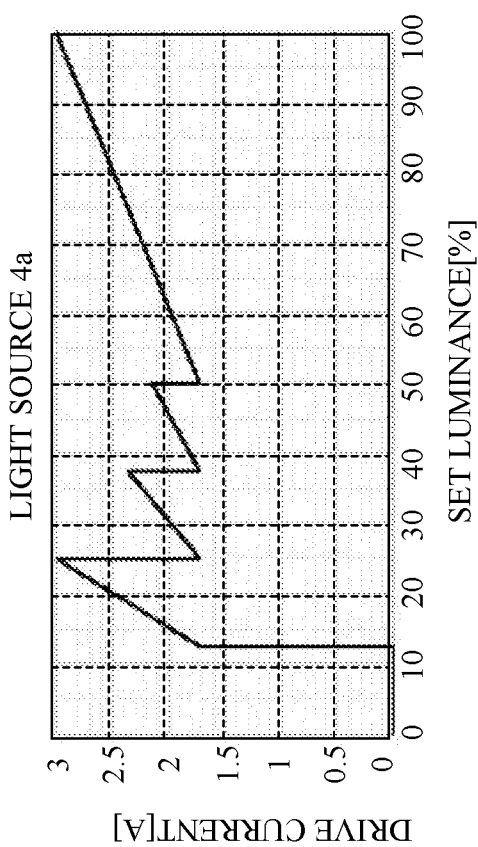
Figure 8D:
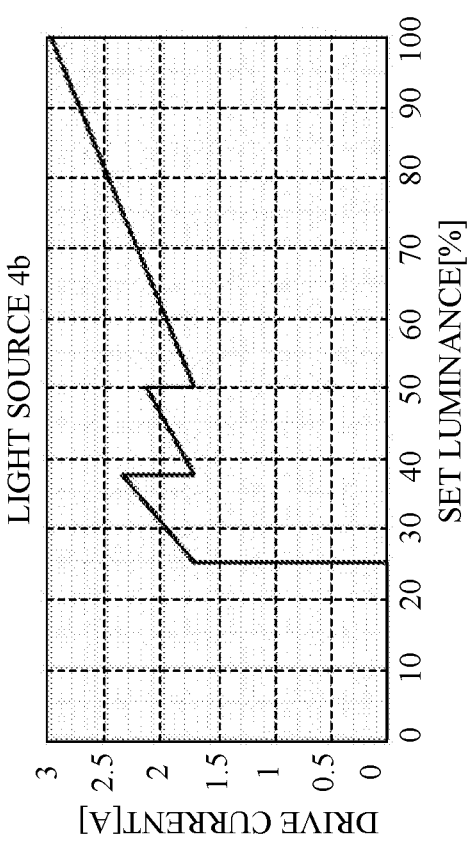

A flowchart in FIG. 7 illustrates the light source control processing performed by the controller 1 in this embodiment. In the step 1, the controller 1 starts this processing.

Next, in the step 7, the controller 1 (drive current determiner 2) determines the number of emission light sources for setting the luminance of the projection light to the luminance set by the luminance setter 28 (referred to as a target luminance hereinafter). At this time, the number of emission light sources may be determined as described with reference to FIG. 3 in the first embodiment, or may be determined by another determination method.

Next, in the step 8, the controller 1 (drive current determiner 2) refers to the light emission history stored in the memory 27 and selects the number of emission light sources determined in the step 7 in ascending order pf the cumulative lighting time among the laser light sources 4a to 4d.

Next, in the step 9, the controller 1 (drive current determiner 2) determines the drive current of each of one or more emission light sources selected in the step 8 in order to set the luminance of the projection light to the target luminance.

Next, in the step 10, the controller 1 causes the light source driver 3 to supply the drive current determined in the step 9 to each of the one or more emission light sources selected in the step 8 to turn on each emission light source. Then, this flow ends.

Referring now to FIGS. 8A to 8D, a description will be given of a method by which the drive current determiner 2 determines the drive current of each emission light source in the step 9. FIG. 8A to 8D illustrate a relationship between the target luminance and the drive currents of the laser light sources 4a to 4d, respectively. For example, when the target luminance is 12.5%, the drive current determiner 2 determines the drive current of the laser light source 4a as the emission light source to 1.7 A, and uses the laser light sources 4b to 4d as the non-emission light sources. When the target luminance is 100%, the drive current determiner 2 determines the drive current of all the laser light sources 4a to 4d as the emission light sources to 3 A.

This embodiment can display the projection image having the luminance desired by the user by turning on the laser light source so that the luminance of the projection light becomes the luminance set by the luminance setter 28.

Fourth Embodiment

Figure 9:
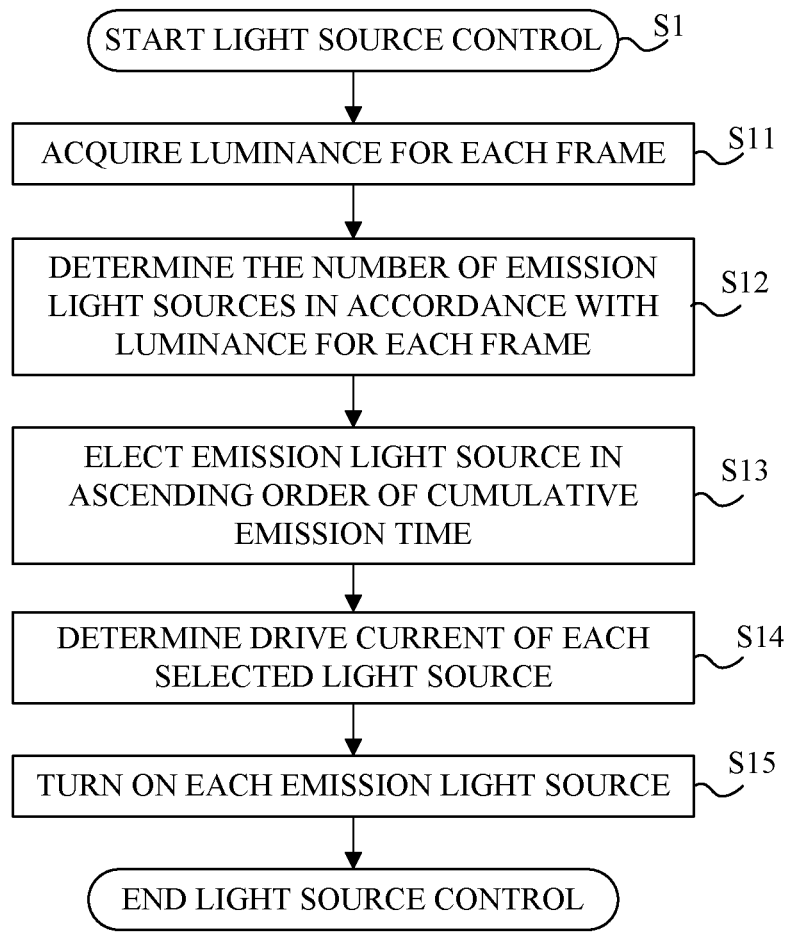
FIG. 9 is a flowchart showing processing performed by the projector according to a fourth embodiment of the present invention.

A flowchart in FIG. 9 illustrates light source control processing performed by the controller 1 in the projector according to a fourth embodiment of the present invention. In the step 1, the controller 1 starts this processing.

Next, in the step 11, the controller 1 acquires the luminance of the input image signal based on the very input image signal from an external device connected to the projector. More specifically, the controller 1 acquires the luminance for each frame of the input image signal. The luminance for each frame is obtained by adding (integrating) luminance values for each pixel in each frame. The luminance of the input image signal is information on the luminance adjustment of the illumination light. Then, the acquired luminance for each frame is input into the drive current determiner 2.

The luminance of the input image signal for each frame may be obtained by a calculation for each frame as described above, or if the information on the luminance for each frame is previously attached to the input image signal (such as one pixel is provided with the information on the luminance of the entire frame instead of information on a color and luminance of the pixel), the luminance for each frame may be acquired from the information.

Next, in the step 12, the controller 1 (drive current determiner 2) determines the number of emission light sources for setting the luminance of each frame of the projection image to the luminance input in the step 11 (referred to as frame luminance hereinafter).

Next, in the step 13, the controller 1 (drive current determiner 2) refers to the light emission history stored in the memory 27 and selects the number of emission light sources determined in the step 12 in ascending order of the cumulative lighting time among the laser light sources 4a to 4d.

Next, in the step 14, the controller 1 (drive current determiner 2) determines each drive current of one or more emission light sources selected in the step 13 in order to set the luminance of the projection light (or the brightness of the projection image) to the frame luminance.

Next, in the step 15, the controller 1 causes the light source driver 3 to supply the drive current determined in the step 14 to each of the one or more emission light sources selected in step 13, thereby turning on each emission light source. Then, this flow ends.

This embodiment can adjust the luminance of the projection light for each frame of the projection image, and thus increase the dynamic contrast of the projection image.

Fifth Embodiment

Figure 10:
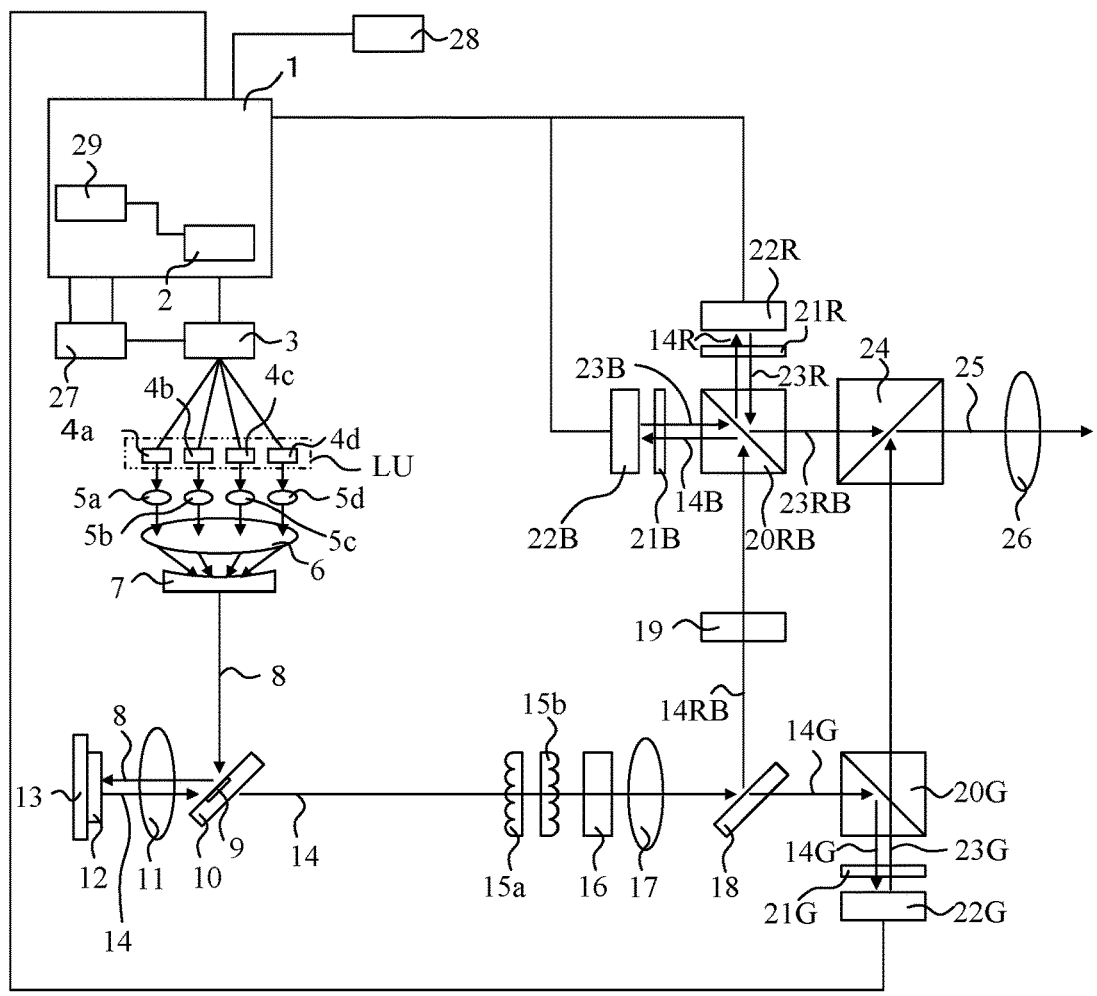
FIG. 10 illustrates a configuration of a projector according to a fifth embodiment of the present invention.
Figure 11:
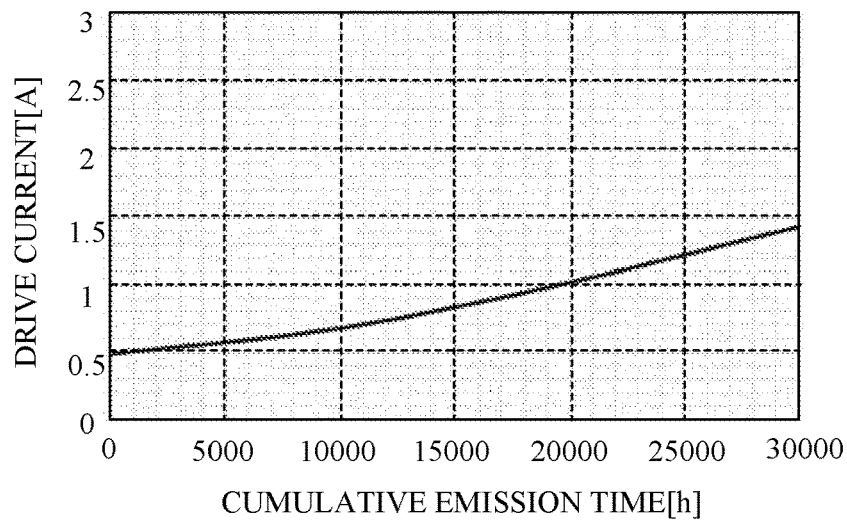
FIG. 11 illustrates a relationship between a cumulative emission time of the light source and a threshold current in the projector according to the fifth embodiment.

FIG. 10 illustrates a configuration of a projector according to a fifth embodiment of the present invention. The projector according to this embodiment is different from that of the third embodiment in that the controller 1 includes an estimator 29. The estimator 29 estimates the threshold current of each laser light source using the light emission history of each laser light source stored in the memory 27. FIG. 11 illustrates a relationship between the cumulative emission time of each laser light source and the threshold current. As illustrated in FIG. 11, the threshold current increases as the cumulative emission time increases.

Figure 12:
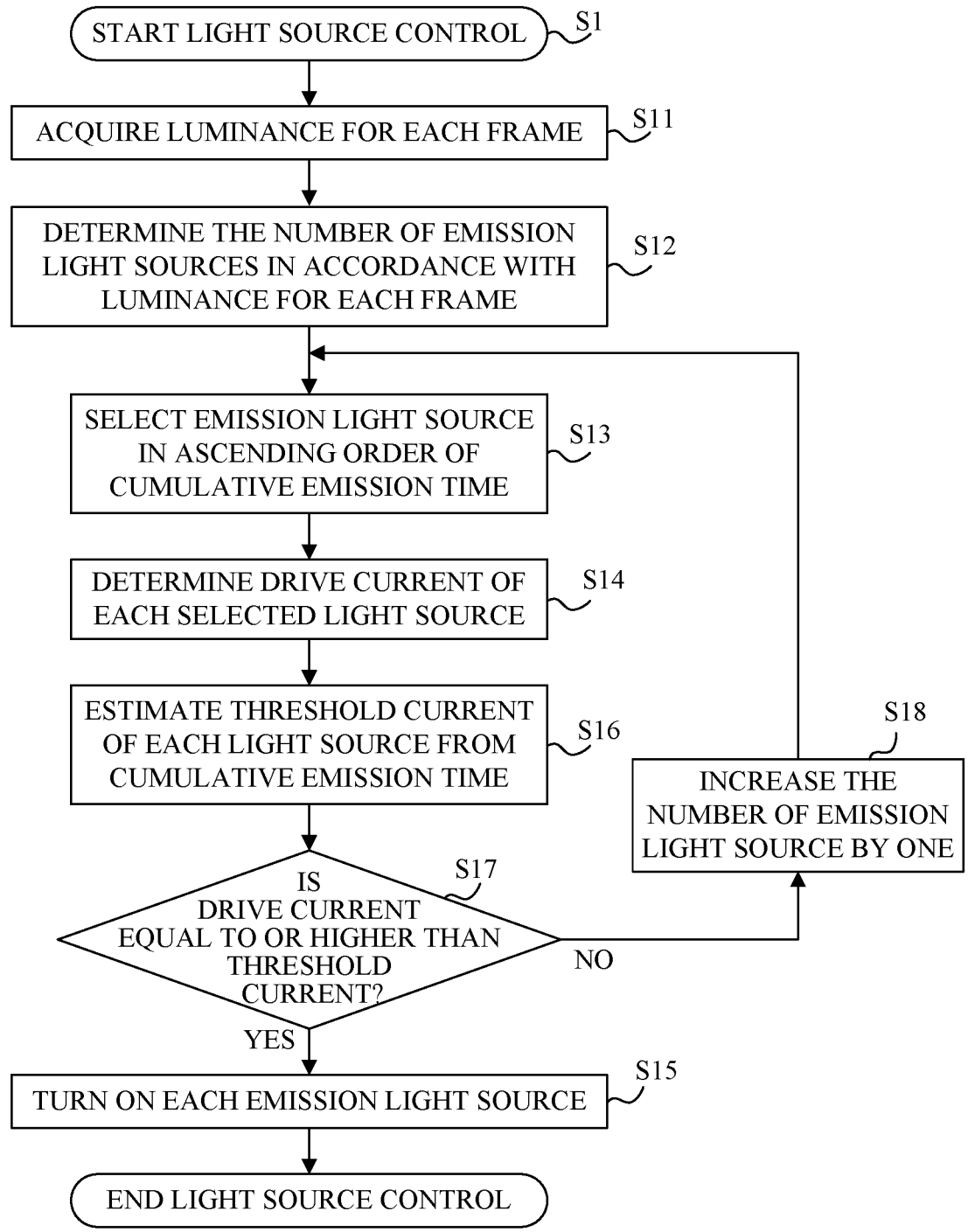
FIG. 12 is a flowchart showing processing performed by the projector according to the fifth embodiment.

A flowchart in FIG. 12 illustrates light source control processing performed by the controller 1 in this embodiment. In the step 1, the controller 1 starts this processing.

The following steps 11 to 14 are the same as the steps 11 to 14 in the fourth embodiment.

In the step 16 following the step 14, the controller 1 (estimator 29) estimates the threshold current of each laser light source from the cumulative emission time included in the light emission history of each laser light source stored in the memory 27. More specifically, the estimator 29 estimates the threshold current of each laser light source using table data indicating the threshold current relative to the cumulative emission time of each laser light source illustrated in FIG. 11.

Next, in the step 17, the controller 1 determines whether or not the drive current of each laser light source determined in the step 14 is equal to or higher than the threshold current estimated in the step 16. If the drive current is equal to or higher than the threshold current, the controller 1 proceeds to the step 15, otherwise proceeds to the step 18.

In the step 18, the controller 1 (drive current determiner 2) reduces the number of emission light sources by one and proceeds to the step 13. Thereby, in the steps 13 and 14, the controller 1 (drive current determiner 2) determines each drive current of the emission light source after the number is reduced. The drive current determined at this time is higher than the previously determined drive current because it is necessary to increase the output of the emission light source since the number of emission light sources reduces, and the controller 1 performs determination in the step 17 again.

In the step 15, the controller 1 causes the light source driver 3 to supply the drive current determined in the step 14 to each of the one or more emission light sources selected in the step 13 to turn on each emission light source. Then, this flow ends.

This embodiment determines the drive current in accordance with the state of the deterioration of each laser light source, rather than previously setting the drive current of each laser light source sufficiently higher than the threshold current. Hence, the output of each laser light source or the output of the light source unit can be adjusted to a narrow range.

Sixth Embodiment

Figure 13:
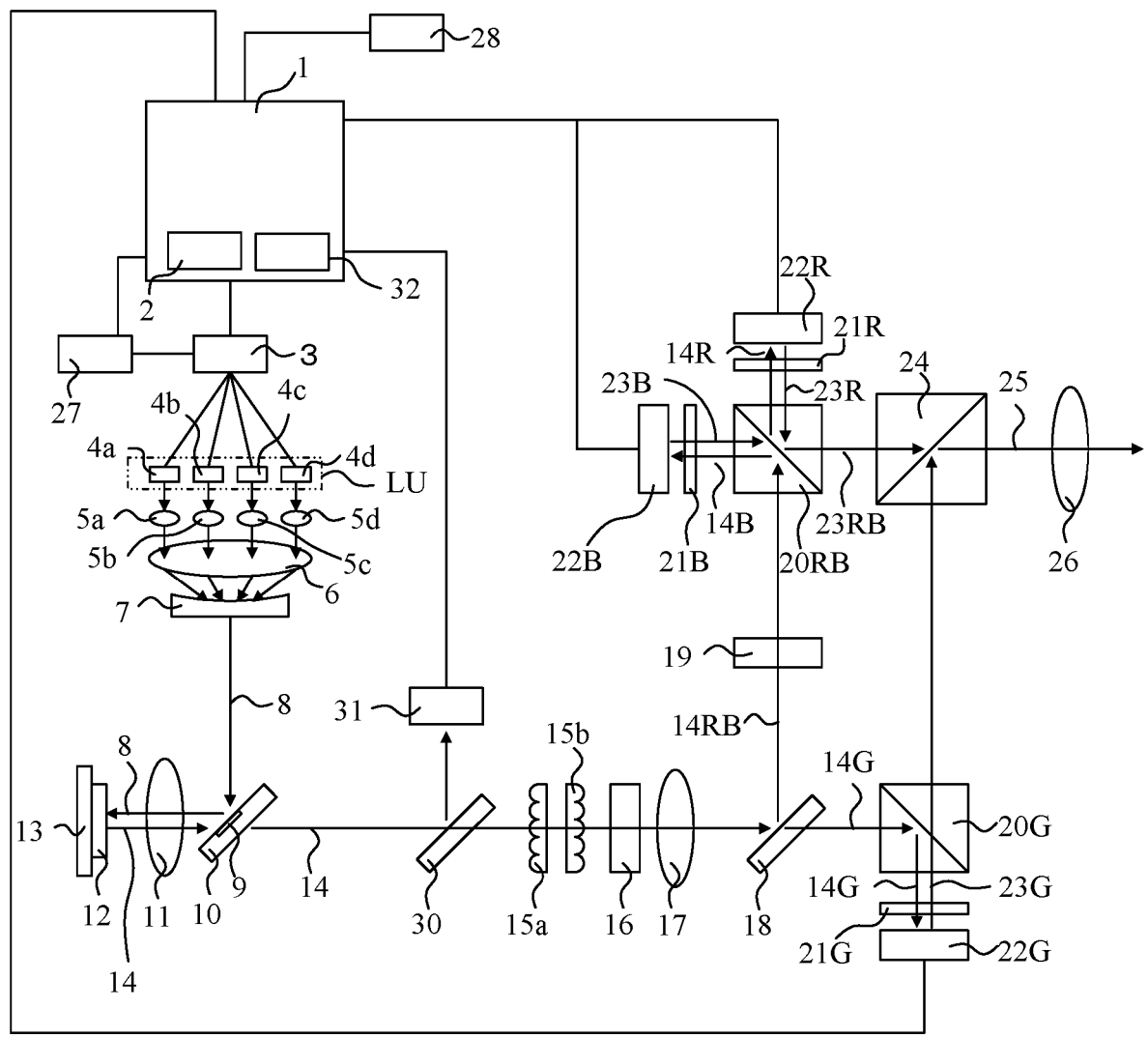
FIG. 13 illustrates a configuration of a projector according to a sixth embodiment of the present invention.

FIG. 13 illustrates a configuration of a projector according to a sixth embodiment of the present invention. The projector according to this embodiment is different from that of the third embodiment in having an optical branch unit 30 and a photometer 31 and in that the controller 1 includes a calculator 32. The optical branch unit 30 reflects part of illumination light 14 using a reflecting member such as a glass flat plate and guides it to the photometer 31. The photometer 31 measures at least part of the light branched by the optical branch unit 30 using a light receiving element such as a photodiode. Data indicating a light amount of measured by the photometer 31 (photometric result: referred to as measured light amount hereinafter) is sent to the calculator 32. The calculator 32 calculates the threshold current of each laser light source using data indicating the measurement light amount from the photometer 31. The threshold current of each laser light source calculated by the calculator 32 is sent to the drive current determiner 2.

Figure 14:
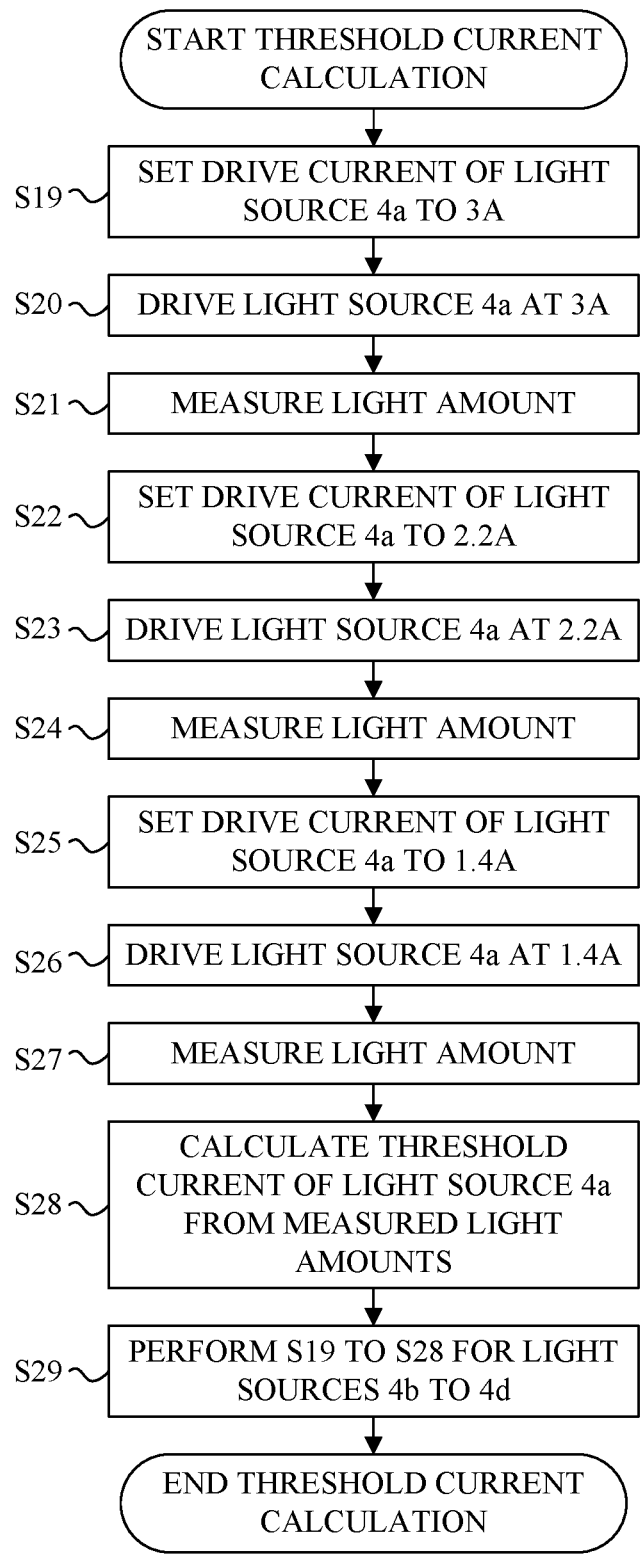
FIG. 14 is a flowchart showing processing performed by the projector according to the sixth embodiment.

A flowchart in FIG. 14 illustrates light source control processing performed by the controller 1 in this embodiment. In the step 1, the controller 1 starts this processing.

Next, in the step 19, the controller 1 (drive current determiner 2) sets the drive current of the laser light source 4a to 3 A. Next, in the step 20, the controller 1 causes the light source driver 3 to supply the drive current of 3 A to the laser light source 4a to turn it on. In the step 21, the controller 1 causes the photometer 31 to measure the light amount.

Next, in the step 22, the controller 1 (drive current determiner 2) sets the drive current of the laser light source 4a to 2.2 A. Next, in the step 23, the controller 1 causes the light source driver 3 to supply the drive current of 2.2 A to the laser light source 4a to turn it on. In the step 24, the controller 1 causes the photometer 31 to measure the light amount.

Next, in the step 25, the controller 1 (drive current determiner 2) sets the drive current of the laser light source 4a to 1.4 A. Next, in the step 26, the controller 1 causes the light source driver 3 to supply the drive current of 1.4 A to the laser light source 4a to turn it on. In the step 27, the controller 1 causes the photometer 31 to measure the light amount.

Next, in the step 28, the controller 1 (calculator 32) calculates the threshold current of the laser light source 4a from the data of the measured light amounts that are the measurement results of the photometer 31 in the steps 21, 24 and 27.

In the step 29, the controller 1 performs the steps 19 to 28 for the laser light sources 4b to 4d. Thus, the threshold currents of all the laser light sources 4b to 4d are calculated.

Figure 15:
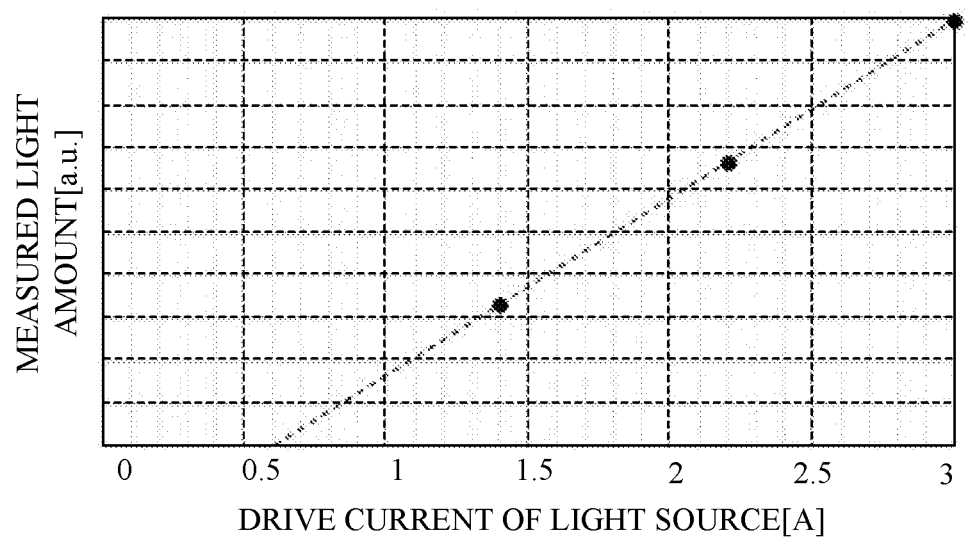
FIG. 15 illustrates photometric results of the projector according to the sixth embodiment.

Referring now to FIG. 15, a description will be given of a method for calculating the threshold current of each laser light source using the measured light amount data obtained from the photometer 31 in the step 28. FIG. 15 illustrates a relationship between the drive current of each laser light source (4a to 4b) and the measured light amount. Three points plotted in FIG. 15 are the measured light amounts obtained in the steps 21, 24 and 27 in FIG. 14, and a broken line is a line obtained by approximating these three points with a linear equation. The threshold current of the laser light source is 0.6 A, which is the intersection between the broken line and the x-axis.

The approximate expression may not be a linear equation. Instead of setting the value of the intersection of the approximate expression and the x axis to the threshold current, the threshold current may be determined by providing an appropriate margin from the intersection value. Alternatively, the threshold current may be determined using an equation that approximates two points. The drive current determiner 2 sets a current higher than the threshold current calculated in the step 28 to the drive current of the laser light source.

This embodiment can recognize the threshold current with higher accuracy by obtaining the threshold current of each laser light source from the actually measured light amount. As a result, the output of each laser light source or the output of the light source unit can be adjusted to a smaller range.

Seventh Embodiment

A configuration of a seventh embodiment according to the present invention is the same as that in FIG. 4, and the light source control processing performed by the controller 1 is the same as that in FIG. 9 of the fourth embodiment. FIGS. 17A to 17D show absolute values of drive current change amounts of the laser light sources 4a to 4d when the target luminance (set luminance) illustrated in FIGS. 8A to 8D is changed by 1%. As understood from FIGS. 8A to 8D and 17A to 17D, the drive current change amount per 1% of the set luminance is large when each laser light source is switched between the emission state and the non-emission state. If the drive current change amount is large, the projection light amount significantly changes in a short time and the user may feel uncomfortable. Accordingly, the present invention reduces the drive current change amount per unit time, when the drive current change amount per 1% of the set luminance is large, so as to restrain the projection light amount from significantly changing in a short time.

Figure 18A:
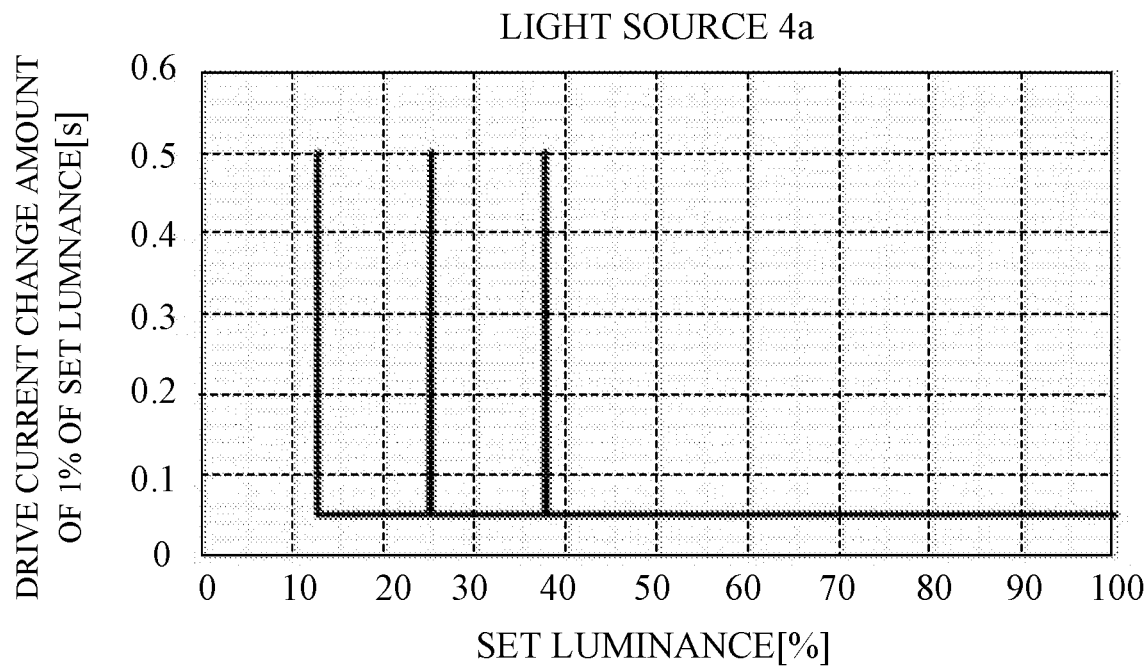
FIGS. 18A to 18D show a relationship between the set luminance and the drive current change amount per 1% of the set luminance in the projector according to the seventh embodiment.
Figure 18B:
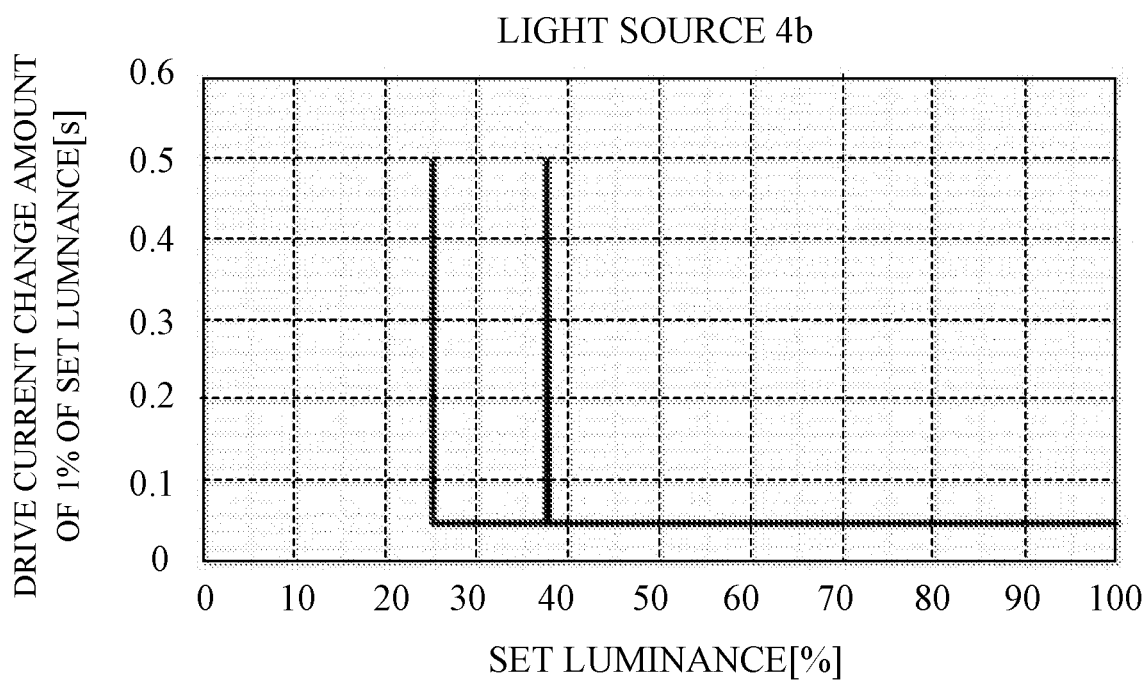
Figure 18C:
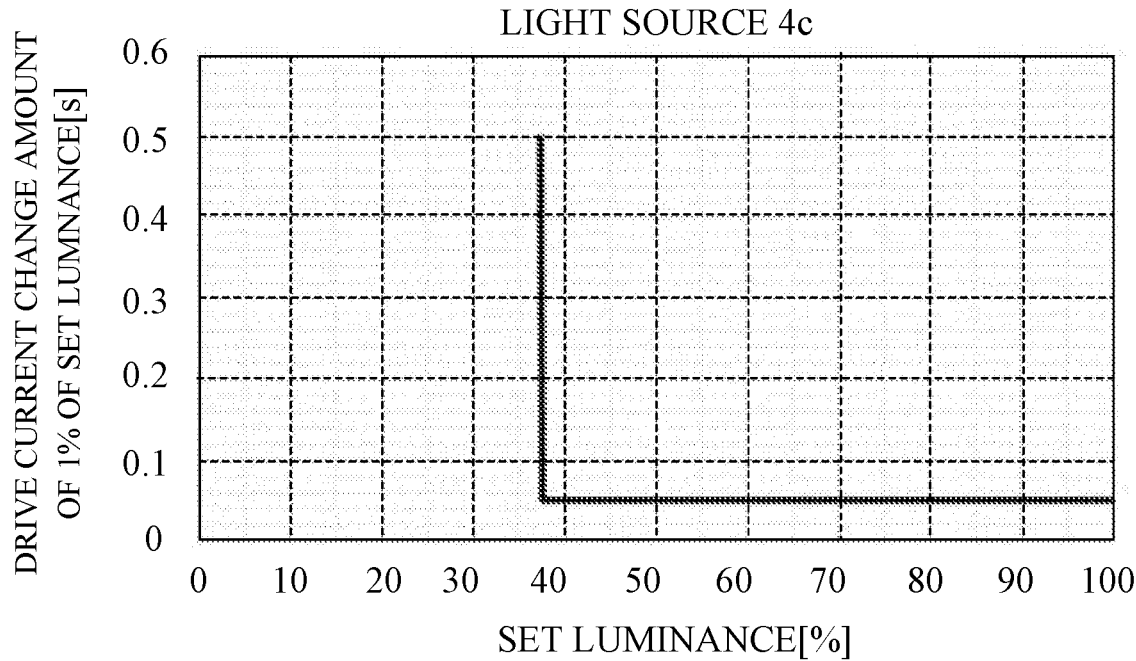
Figure 18D:
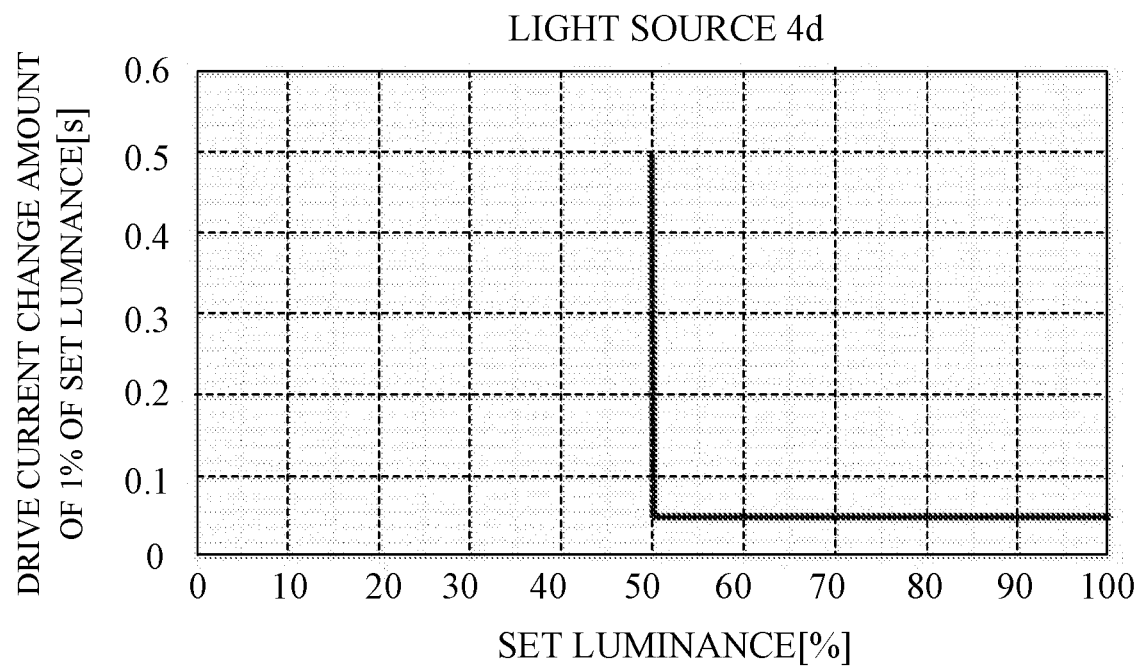

FIGS. 18A to 18D illustrate the time required to change the drive current relative to the set luminance for each of the laser light sources 4a to 4d. When the drive current change amount of each laser light source is smaller than 0.5 A (predetermined value) when the set luminance is changed by 1%, this embodiment changes the drive current at 0.05 s per 1% of the set luminance. When the drive current change amount is 0.5 A or larger, this embodiment changes the drive current with a change time of 0.5 s per 1% of the set luminance. For example, from FIG. 17D, the drive current change amount of the laser light source 4d is 1.7 A which is higher than 0.5 A when the set luminance is changed from 49% to 50% and from 51% to 50%. Accordingly, as illustrated in FIG. 18D, when the set luminance is changed from 49% to 50% and from 51% to 50%, the drive current of the laser light source 4d is changed over 0.5 s, and when the luminance is changed to other setting luminance, the drive current is changed with a change time of 0.05 s.

This embodiment reduces the drive current change amount per unit time, when the drive current change amount per 1% of the set luminance is large. Thereby, this embodiment can restrain the projection light amount from changing instantaneously discontinuously.

Variation

Each of the above embodiments has described that a light source having a short cumulative emission time is preferentially selected from among the laser light sources. Which laser light source is preferentially selected as the emission light source may be determined based on the temperature history and the drive current history of the laser light source. The cumulative emission time may be weighted according to the temperature or the drive current of the laser light source when the laser light source is turned on, rather than the actual time when the laser light source is turned on. More specifically, when the temperature or the drive current of the laser light source is high, weighting may be made so as to make longer the emission time.

While each embodiment uses a semiconductor laser diode that emits blue light for the laser light source, a semiconductor laser diode that emits green light or red light may be combined. While each embodiment has described four laser light sources included in the light source unit, the number of laser light sources is not limited as long as the number is two or more.

Each embodiment has described the digitally driven optical modulation element, but may analogously drive them. The light modulation element is not limited to the reflection type liquid crystal display element, but may be a transmission type liquid crystal display element or a digital micromirror device. The phosphor may be a transmission type instead of the reflection type.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention can control the luminance of illumination light from the light source unit including the plurality of laser light sources while displaying a good projection image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-208512, filed on Nov. 6, 2018 which is hereby incorporated by reference herein in its entirety.

What is claimed is:

1. An image projection apparatus comprising:
a light source unit including a plurality of laser light sources;
a light modulation element configured to modulate illumination light generated using a laser beam from the light source unit and to generate image light projected onto a projection surface;

a controller configured to control driving of the plurality of laser light sources, wherein the controller controls a luminance of the illumination light by selecting a first laser light source that emits the laser beam and a second laser light source that does not emit the laser beam among the plurality of laser light sources, wherein the controller makes a drive current of the first laser light source higher than a minimum value at which the first laser light source can emit the laser beam, and sets the drive current of the second laser light source to 0 or lower than the minimum value, and wherein the controller changes the minimum value.

2. The image projection apparatus according to claim 1, wherein the controller selects the first and second laser light sources in accordance with a light emission history of the plurality of laser light sources.

3. The image projection apparatus according to claim 1, wherein the controller selects the first and second laser light sources in accordance with information on a luminance adjustment of the illumination light.

4. The image projection apparatus according to claim 3, wherein the information on the luminance adjustment of the illumination light is a luminance setting of a projection image formed by the image light.

5. The image projection apparatus according to claim 3, further comprising a driver configured to drive the light modulation element in accordance with an input image signal, wherein the information on the luminance adjustment of the illumination light is information indicating a luminance of the input image signal.

6. The image projection apparatus according to claim 1, wherein the controller changes the minimum value according to a light emission history of the first laser light source.

7. The image projection apparatus according to claim 1, further comprising a photometric means for measuring a laser beam from the light source unit, wherein the controller changes the minimum value in accordance with a photometric result of the laser beam.

8. The image projection apparatus according to claim 1, wherein the controller reduces the number of the first laser light sources, when the drive current of the first laser light source is lower than the minimum value.

9. The image projection apparatus according to claim 3, wherein a drive current change time when a drive current change amount of the first laser light source is a predetermined value or larger is longer than that when the drive current change amount of the first laser light source is smaller than the predetermined value, in changing a drive current of the first laser light source in accordance with the information on the luminance adjustment of the illumination light.

10. The image projection apparatus according to claim 9, wherein a drive current change time when the number of first laser light sources is changed is longer than that when the number of first laser light sources is not changed, in changing a drive current of the first laser light source in accordance with the information on the luminance adjustment of the illumination light.

11. The image projection apparatus according to claim 1, further comprising a uniformizing optical system configured to make uniform the luminance of the laser beam from the light source unit on a modulation surface of the light modulation element.

12. The image projection apparatus according to claim 1, further comprising a driver configured to digitally drive the light modulation element.

13. A light source control method for an image projection apparatus configured to modulate illumination light generated using a laser beam from a light source unit including a plurality of laser light sources, through a light modulation element, and to project an image on a projection surface, the light source control method comprising:

controlling a luminance of the illumination light by selecting a first laser light source that emits the laser beam and a second laser light source that does not emit the laser beam among the plurality of laser light sources, making a drive current of the first laser light source higher than a minimum value at which the first laser light source can emit the laser beam, and setting the drive current of the second laser light source to 0 or lower than the minimum value, and changing the minimum value.

14. A non-transitory computer-readable storage medium storing a computer program that enables a computer to execute a light source control method for an image projection apparatus configured to modulate illumination light generated using a laser beam from a light source unit including a plurality of laser light sources, through a light modulation element, and to project an image on a projection surface, the light source control method comprising:

controlling a luminance of the illumination light by selecting a first laser light source that emits the laser beam and a second laser light source that does not emit the laser beam among the plurality of laser light sources, making a drive current of the first laser light source higher than a minimum value at which the first laser light source can emit the laser beam, and setting the drive current of the second laser light source to 0 or lower than the minimum value, and changing the minimum value.

* * * * *